Dec. 30, 1924.  P. W. DIETMANN  1,521,080
MULTIPLE MILLING MACHINE
Filed March 15, 1921  2 Sheets-Sheet 1

Inventor
Paul W. Dietmann,
By [signature] Atty.

Dec. 30, 1924. 1,521,080
P. W. DIETMANN
MULTIPLE MILLING MACHINE
Filed March 15, 1921  2 Sheets-Sheet 2
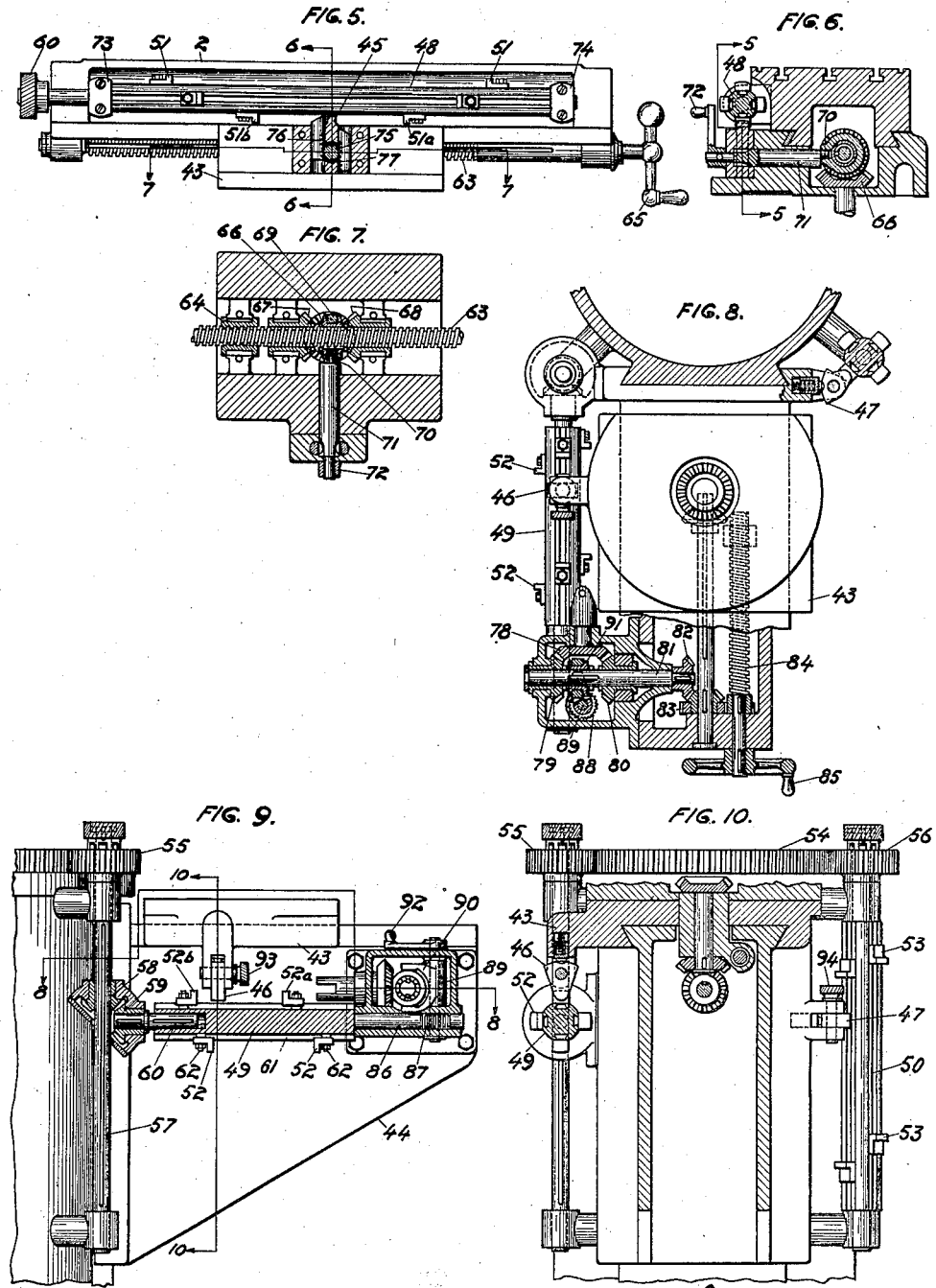
Inventor.
Paul W. Dietmann Patented Dec. 30, 1924.

1,521,080

UNITED STATES PATENT OFFICE.

PAUL WILHELM DIETMANN, OF KALMAR, SWEDEN.

MULTIPLE MILLING MACHINE.

Application filed March 15, 1921. Serial No. 452,435.

*To all whom it may concern:*

Be it known that I, PAUL WILHELM DIETMANN, a citizen of the Kingdom of Sweden, residing at Kalmar, Sweden, have invented new and useful Multiple Milling Machines, of which the following is a specification.

This invention relates to milling machines in general and especially to such milling machines, which are provided with a movable turret or revolving head, which carries a plurality of milling or boring cutter holders. The main object of the invention is to make it possible to perform a number of subsequent milling or boring operations on any number of similar work pieces, with the greatest possible exactness without using complicated and costly gigs and fixtures. To this end the different parts of the table, which are as usual in milling machines movable in two or three directions at right angles to each other, and the parts relatively to which said parts are movable are provided, the former with rigid stop members and the latter with drums, carrying axially adjustable stop members or dogs, or vice versa. When the milling machine is of revolving head type, said drums are rotatable and preferably provided with as many axial series of stop members as the revolving head has working positions. In this way, when one work piece has been properly milled and bored, and the corresponding stop members on the drums are set in positions corresponding to the different operations, any number of similar work pieces may be wrought exactly the same way and to exactly the same shape.

The invention is illustrated by the accompanying drawings in which:

Fig. 5 is a vertical section on line 5—5 of Fig. 2;

Fig. 6 is a vertical section on line 6—6 of Fig. 5; and

Fig. 7 is a horizontal section on line 7—7 of Fig. 5;

Fig. 8 is a horizontal section on line 8—8 of Fig. 9 and

Fig. 9 is a vertical section on line 9—9 of Fig. 3;

Fig. 10 is a vertical section on line 10—10 of Fig. 9.

Figure 4:
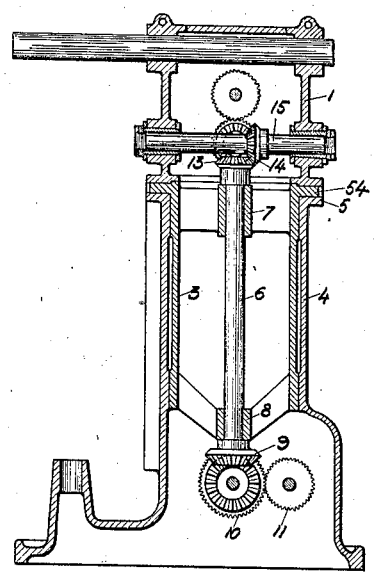
Fig. 4 is a central longitudinal section on line 4—4 of Fig. 1.

The drawings show a milling machine with a rotary head 1, carrying four cutter shafts or cutter holders arranged at an angle of 90° relatively to each other said cutter holders being adapted by corresponding rotation of the cutter support to be successively moved into operative position above the table 2. The rotary cutter support 1 is rigidly connected to a long tubular neck 3, rotatably mounted in a corresponding bore formed in the stand 4, the upper flange 5 of said stand 4 forming a support for the rotary cutter support. The neck 3 is formed with central bearings 7, 8, in which there is mounted a vertical shaft 6, driven from the pulley 12, by means of a bevel gear 9, and the spur gear wheels 10, 11 of the usual gear box. The shaft 6 carries at its upper end a bevel gear wheel 13, meshing with a bevel gear wheel 14 on the main shaft 15, carrying the milling tolls 16, 17.

Figure 1:
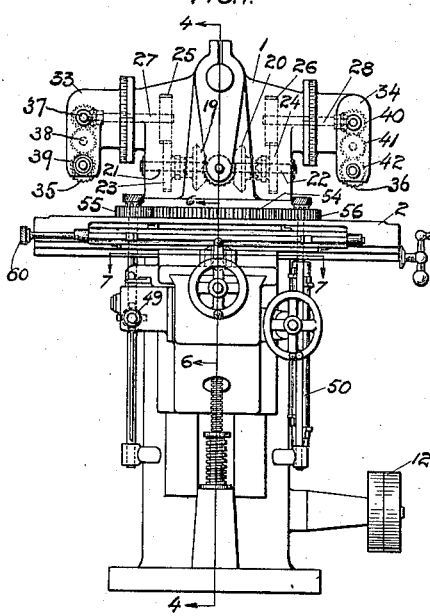
Figure 1 is a front elevation of the complete milling machine.

The bevel gear wheel 13 meshes not only with the bevel gear wheel 14 of the shaft 15, but also with two other bevel gear wheels 19, 20 attached to shafts 21 and 22, respectively. The bevel gear wheels 19 and 20 are loosely mounted on their shafts and may be engaged with, or disengaged from wheels 23, 24, meshing with wheels 25, 26 on the shafts 27, 28 respectively which are situated above the shafts 21, 22 and drive the milling or boring tools 31, 32, (Fig. 3) by means of bevel gears 29, 30. The said tools are mounted in holders 33, 34, respectively, which may be turned in a vertical plane and may be adjusted into any angular position desired by means of suitable graduated scales. The said cutter holders 33, 34 may also, as shown in Figs. 1 and 2, carry a second milling tool 35, 36 the shafts of which are driven from the shafts of the tools 31, 32 by the intermediary of gear wheels 37, 38, 39, and 40, 41, 42 respectively.

Figure 3:
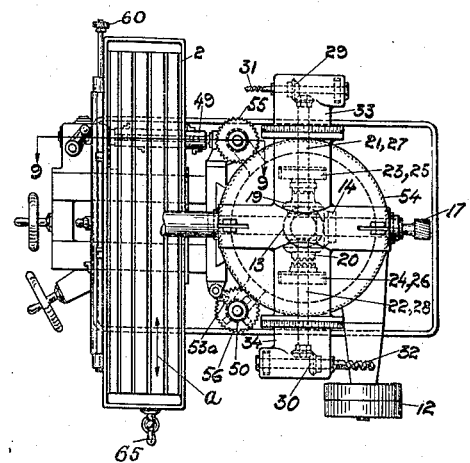
Fig. 3 is a top plan view.
Figure 2:
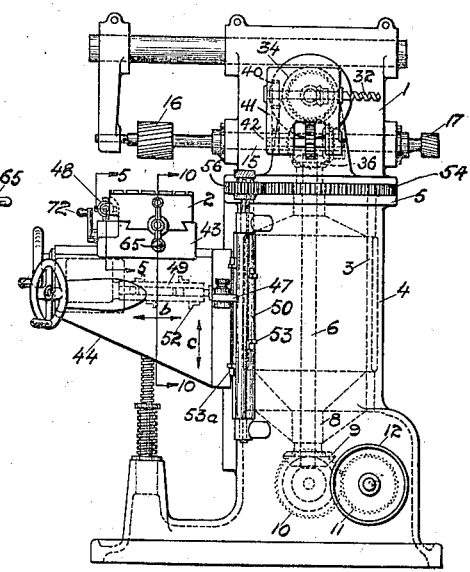
Fig. 2 is a side elevation.

The table 2 is in the usual way movable in the direction as shown by the arrows *a* Fig. 3, and is carried by the member 43 which is movable in the direction as shown by the arrows *b*, Fig. 2, said member 43 being in turn carried by the bracket 44, movable in the direction, as shown by the arrows, *c*, (Fig. 2).

To control all operations in the direction as shown by the arrows, *a*, the table 2 carries a drum 48 co-operating with a rigid stop member 45, (Fig. 5) carried by the table member 43. In the same way the operations in the directions as shown by the arrows $b$ are controlled by the stop drum 49 and the rigid stop member 46 (Fig. 9) and finally the operations in the direction as shown by the arrows $c$ by the drum 50 and the rigid stop member 47, Fig. 2. Said drums 48, 49 and 50 are rotatable around shafts, situated in the respective directions of movement, as shown by the arrows, $a$, $b$, and $c$, and each of them carries a number of series of axially adustable stop members 51, 52 and 53 respectively, the number of series on each drum being preferably the same as the number of operative positions of the revolving head; in the illustrated embodiment of the invention four such positions are provided for. A definite series of the four series of axially adjustable stop members of each drum is individual to a definite operative position of the revolving head 1. Thus, for instance, the series of stop members $53^a$ (Figs. 2, 3) of the drum 50 is individual to the position (Fig. 2) in which the tool 16 operates and so on. The drums carrying the adjustable stop members may be turned to bring the proper series into operative positions, corresponding to the position of the revolving head, either manually or automatically. To enable such an automatic adjustment, the revolving head is provided with a toothed rim 54, engaged by the toothed wheels 55, 56 of which the wheel 55 rotates the drum 49 by the intermediary of the shaft 57, (Fig. 9), the bevel gear wheels 58, 59 and the key 60, while the toothed wheel 56 rotates the drum 50 directly (Fig. 10). At each quarter of a revolution of the toothed rim 54, (corresponding to the rotation of the revolving head 1 from one operative position and into that succeeding it) the wheels 55, 56 perform one complete revolution and a quarter of the succeeding revolution, whereby for each operative position of the cutter support the corresponding series of stop members are brought into operative position. The drum 48 on the table member 2 has been shown as rotated manually and is turned by means of the knob 60, (Fig. 5).

The stop members 51, 52, and 53 of the different drums run in axial slots 61, (Fig. 9) and are locked in convenient positions by means of screws 62.

The stop drum 48 and members 51, 45 for controlling the working operations in the direction as shown by the arrows $a$ and the corresponding table feeding arrangements are shown in detail in Figs. 5, 6, 7. The table 2 gets its feed motion (in the direction indicated by the arrows $a$) by means of the screw 63, working as usual in a nut 64 and actuated either by the handlever 65 or from the bevel gear wheel 66, (Fig. 7) which engages the bevel gear wheels 67, 68, which are coupled to or uncoupled from the screw 63 by means of a coupling 69, which may be brought in either of its operative positions or in the middle stop position by means of the eccentric pin 70 on the shaft 71, operated by the hand lever 72, (Fig. 6). The stop drum 48 with its four series of adjustable stop members 51 is carried by two bearings 73, 74. To automatically uncouple the feed according to the position of the stop members 51, the shaft 71 is near the outer end formed as a pinion 75 (Fig. 5), engaging two small racks formed on the inside of the tappets 76, 77, embracing the stop member 45. It is easily understood that the tappet 76 is in its top position, when the table 2 is fed in one direction and the tappet 77 in its top position, when the table is fed in the opposite direction. When the table is stopped, the tappets 76, 77 are in their middle position, uncovering the rigid stop member 45.

The mechanism operates as follows: In a certain position of the revolving head, the two stop members $51^a$ and $51^b$ are locked in positions corresponding to the beginning and end of a certain milling operation. The adjustable stop member $51^a$ is brought to rest against the rigid stop member 45. When the machine feed is coupled in by the hand lever 72, bringing the coupling 69 in its right position (Fig. 7) and the tappet 76 in its top position, the table 2 starts its movement to the right. When the stop member $51^b$ at the end of said movement reaches the oblique top surface of the tappet 76, the latter is brought down in its middle position and the machine feed is uncoupled. To get an absolutely exact stop position the front surface of the stop member $51^b$ is then manually,—by means of the hand lever 65,— brought into contact with the rigid stop member 45.

Figs. 8, 9, and 10 show the drum 49 and stop members 52 and 46 for controlling the working operations in the direction as shown by the arrows $b$ and the corresponding arrangements for feeding the table member 43 in the same direction. The machine feed is transferred to the table member 43 in the usual way by means of a universal joint and the bevel gear wheel 78, one of the two bevel gear wheels 79, 80, the shaft 81, the bevel gear 82, the cylindrical gear 83 and the screw 84. For manual feed, the hand wheel 85 is used. The drum 49 is movable in axial direction, and is shown (Fig. 9) in its right end position. The cylindrical end part 86 of said drum 49 is partly formed as a rack 87 gearing with a small pinion 88 on the shaft 89, to which is fixed the coupling lever 90 which operates the coupling 91, which is brought into engagement with either of the wheels 79 or 80, according to the direction of movement of the table part 43, by means of the hand lever 92. The rigid stop member 46 may be turned out of the way of the stop members 52 by means of the knob, 93.

The operation of said mechanism is the following: In a certain position of the revolving head, the two stop members 52ª and 52ᵇ are adjusted to positions corresponding to the beginning and end of the operation in the direction as shown by the arrows $b$ to be performed. The adjustable stop member 52ª is brought against the front surface of the rigid stop member 46 and the hand lever 92 is turned to the left (Fig. 9) thereby coupling the gear wheel 79. The table part 43 then moves to the left (Fig. 9) until the rigid stop 46 strikes the stop member 52ᵇ, thus bringing the coupling 91 in its middle, inactive position and stopping the feed.

The third drum 50 (Fig. 10) is not provided with automatically disengaging arrangements for the feed motion, as the milling machines are usually not provided with machine feeding arrangements in the vertical direction as shown by the arrows $c$. The rigid stop member 47 is identical with the stop member 46 and may be turned out of the way of the stop members 53 by means of the knob 94, (Fig. 10). The rigid stop members 46, 47 are so formed and actuated by springs that they retake the operative central position automatically when turned out of the same.

The machine above described is specially adapted for effecting of a plurality of successive milling or boring operations on several similar work pieces. It is evident, that it is possible to obtain, without the need of complicated fixing members, exactly uniform operation on the several work pieces by fixing the latter on the table 2 by means of simple fixing members and then adjusting the various series of stop members 51, 52, 53 to accurately agree with the positions or operative movements of the table at the operation of the first work piece.

I claim—

1. In a milling machine, the combination with a machine frame, of a work supporting table movable in three directions at right angles to each other, said table comprising parts movable with respect to said frame and to each other, a rigid stop member and a rotatable drum for each of said directions, each drum having its axis extending in the respective direction and carrying a plurality of axially extending series of axially adjustable stop members to co-operate with said rigid stop member, the rigid stop member and the drum corresponding to each direction being each carried by a separate one of said parts which are movable relatively to each other in the respective direction.

2. In a milling machine, the combination with a machine frame, of a revolving tool supporting head, a work supporting table movable in three directions at right angles to each other, said table comprising parts movable with respect to said frame and to each other, a rigid stop member and a rotatable drum for each of said directions, each drum having its axis extending in the respective direction and carrying a plurality of axially extending series of axially adjustable stop members to co-operate with said rigid stop member, the rigid stop member and the drum corresponding to each direction being each carried by a separate one of said parts, which are movable relatively to each other in the respective direction, and means for automatically turning the drums to bring the proper series of adjustable stop members thereon into operative position upon the turning of the revolving head.

In testimony whereof I have signed my name.

PAUL WILHELM DIETMANN.